Patented July 15, 1941

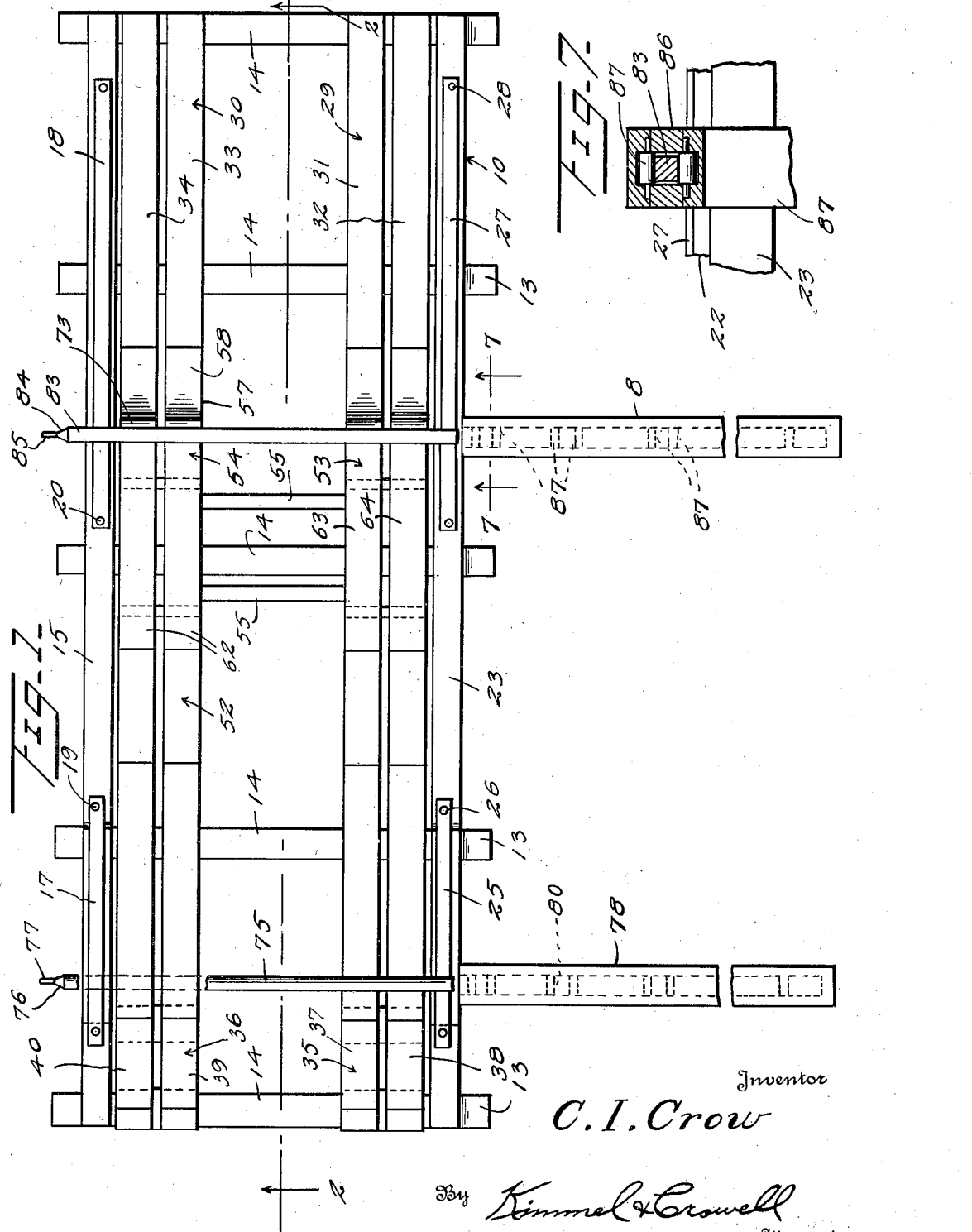

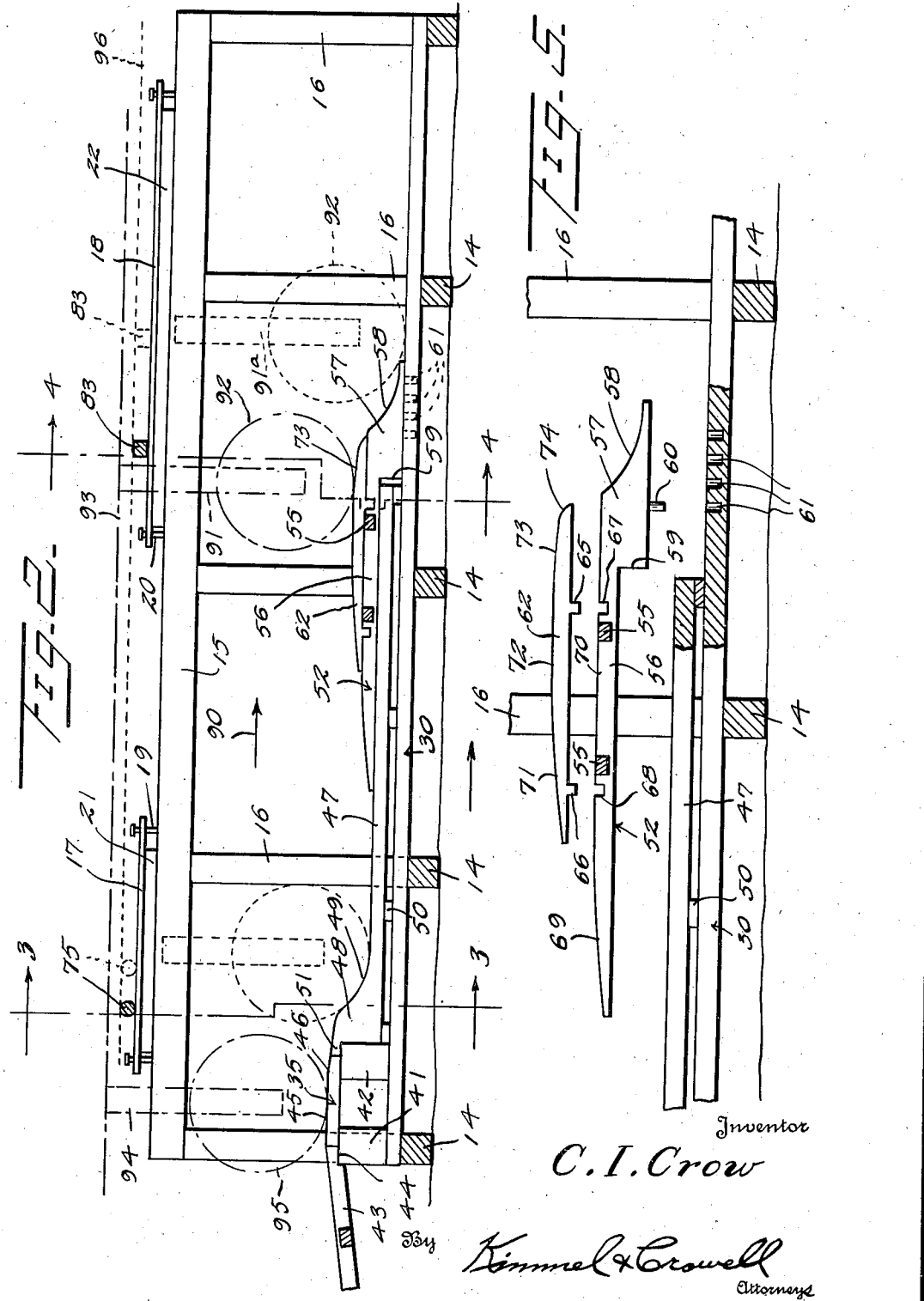

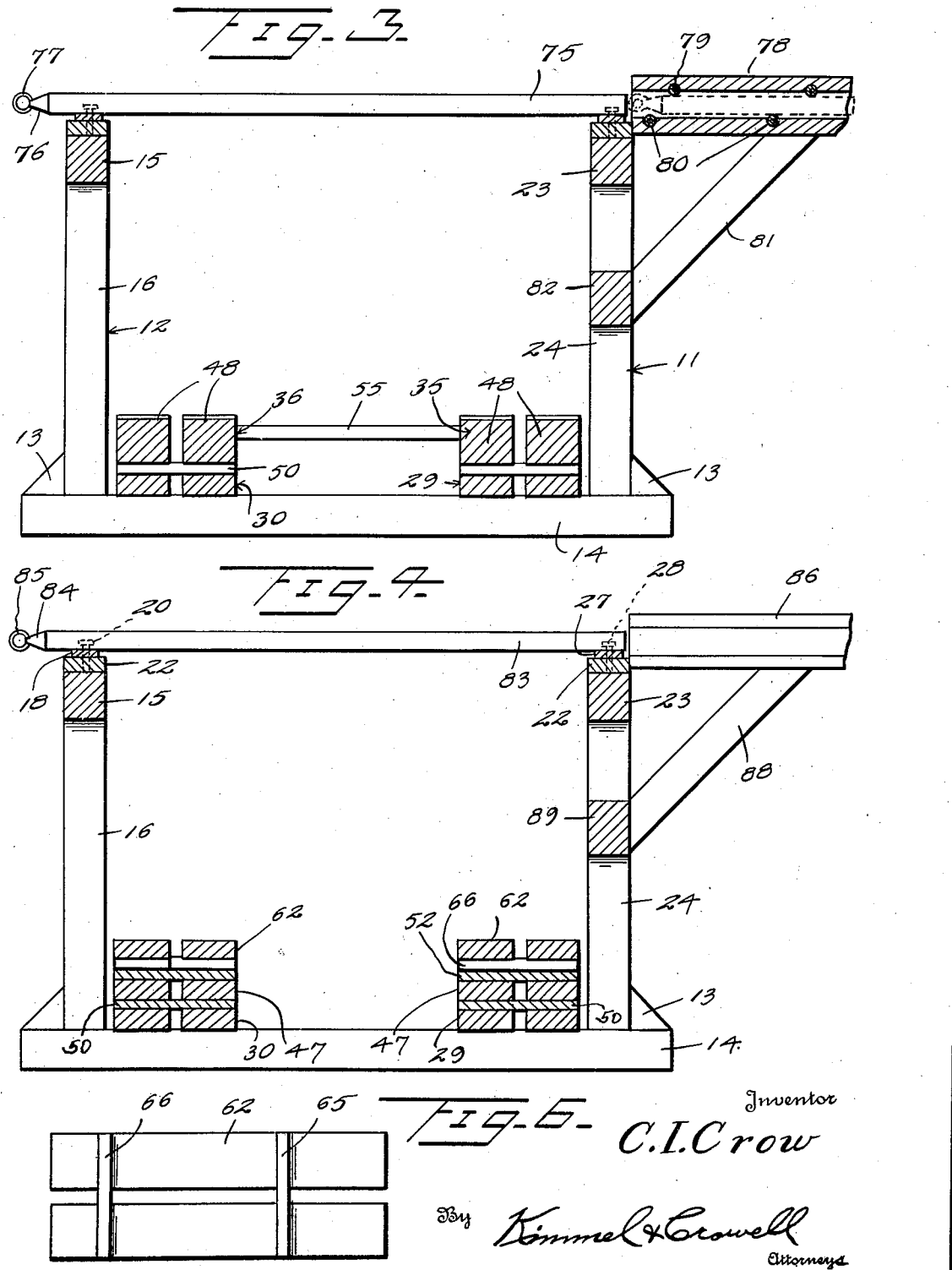

2,249,683

UNITED STATES PATENT OFFICE 2,249,683

TRUCK TRAILER UNLOADING DEVICE

Coy I. Crow, Zwolle, La.

Application July 23, 1940, Serial No. 347,059

8 Claims. (Cl. 214—44)

This invention relates to an unloading device for unloading in a single operation a complete load from a vehicle.

An object of this invention is to provide a means whereby one person may easily and quickly remove the load of a vehicle.

Another object of this invention is to provide a device whereby a load may be removed from a vehicle without jar or strain to either the vehicle or the load.

A further object of this invention is to provide a device of this kind which may readily be adapted to remove loads from vehicles of different kinds, that is, vehicles wherein the bodies or bolsters are of different heights from the ground.

A still further object of this invention is to provide a device of this kind which may be of a portable nature so that it can readily be shifted to the desired location.

A further object of this invention is to provide a device of this kind which will eliminate lost time now experienced in unloading a vehicle.

A further object of this invention is to provide a device of this kind which will handle long articles, such as lumber, logs, rails, pipes, beams or the like, one person being able in a very short space of time to remove the complete load as a unit irrespective of the total weight of the load.

Embodying the foregoing objects and to others which may hereinafter appear, the invention consists of the novel construction, combination and arrangement of parts as will be more specifically referred to and as illustrated in the accompanying drawings wherein are shown embodiments of the invention, but it is to be understood that changes, variations and modifications may be resorted to which fall within the scope of the invention as claimed.

In the drawings:

Figure 1 is a detail top plan partly broken away of a vehicle unloading device constructed according to an embodiment of this invention, Figure 2 is a longitudinal section taken through the device on the line 2—2 of Figure 1 and showing diagrammatically the several positions of the vehicle in its movement through the device, Figure 3 is a sectional view taken on the line 3—3 of Figure 2, Figure 4 is a sectional view taken on the line 4—4 of Figure 2, Figure 5 is a fragmentary longitudinal section partly exploded taken through the center of the apparatus, Figure 6 is a bottom plan of one of the removable vehicle elevating members, and Figure 7 is a sectional view taken on the line 7—7 of Figure 1.

Referring to the drawings, the numeral 10 designates generally a load supporting frame structure which includes a pair of side frame members 11 and 12. The side frame members 11 and 12 are fixed to a plurality of parallel transversely disposed base beams 14, which are adapted to be secured to the side members 11 and 12 in any suitable manner. Triangular bracing members 13 are adapted to be secured to the extended end portions of the base members 14 and also to the side frame members 11 and 12. The side frame member 12 comprises a top rail 15, which is fixed to the upper ends of a plurality of uprights 16. The uprights 16 at their lower ends are fixed to the transverse beams 14. The rail 15 has mounted on the upper surface thereof a pair of metal strips 17 and 18, which are disposed in spaced apart relation and preferably the metal strip 17 is disposed adjacent the intake end of the frame structure and the strip 18 is disposed adjacent the outlet end of the frame structure. The metal strip 17 is held against endwise movement relative to the rail 15 by means of a pair of pegs or fastening devices 19, which extend into the beam or rail 15. The metal strip 18 is substantially longer than the strip 17 and is held against endwise movement relative to the rail or beam 15 by means of a pair of pegs or bolts 20. Preferably the two metal strips 17 and 18 are mounted on the rail or beam 15 in a manner whereby, if desired, a shim or spacer 21 may be interposed between the strip 17 and the rail 15 and a second shim 22 may be interposed between the metal strip 18 and the rail 15.

The side member 11 comprises an upper horizontal load supporting rail or beam 23, which is fixed to the upper ends of a plurality of uprights 24. The uprights 24 at their lower ends are secured to the base members 14 and the bracing members 13 engage against the outer sides of the uprights 24, and also the outer sides of the uprights 16. The rail 23 has mounted on the upper side thereof a metal strip 25 similar to the strip 17, the strip 25 being held against endwise movement by means of fastening devices 26, which are of such a construction as to permit vertical shifting or raising of the strip 25 to admit of the insertion of a shim between the strip 25 and the rail 23, the shim being similar to the shim 21. The rail 23 also has mounted on the upper side thereof an elongated rear metal strip 27, which is held against endwise movement by means of fastening devices 28. The metal strip 27 is permitted to have vertical movement relative to the rail 23 so as to admit of the insertion of the desired thickness of shim between the strip 27 and the rail 23 similar to the shim 22.

A pair of track members, generally designated as 29 and 30, are mounted between the two side members 11 and 12, the track members 29 and 30 being secured to the base members 14. The track member 29 comprises a pair of elongated spaced apart parallel members 31 and 32, which are secured to the base members 14. The track member 30 comprises an inner elongated member 33 and an outer elongated member 34. The two members 33 and 34 comprise a single track and are fixed in any suitable manner to the horizontal base members 14. Preferably the two track members 29 and 30 are of a sufficient width to provide traction surfaces for a vehicle embodying the use of pairs of tires on each side thereof.

At the rear end of the frame structure there are disposed a pair of vertically offset track members 35 and 36, the track member 35 including a pair of spaced apart tracks 37 and 38 and the track 36 comprising tracks 39 and 40. The tracks 35 and 36 are of similar construction being disposed in the same horizontal plane, and each track 35 and 36 is supported in upwardly spaced relation to a lower level track 29 or 30 by means of track supporting members 41 and 42. The rear ends of the tracks 35 and 36 are disposed forwardly of the rear vertical edge of a supporting member 41, as shown in Figure 2, so that a ramp structure 43 may rest on the ledge 44 formed by the forward offsetting of the track 35 relatively to the supporting member 41. The upper surface of the track 35 is provided with a horizontal part 45, which merges at its forward end into a downwardly inclined surface 46. A supplemental track 47 is disposed on top of the track 29 or 30 and the rear end of the supplemental track 47 is formed with a block 48, which is provided with a concave wheel engaging surface 49. The concave wheel engaging surface 49 merges at its rear upper end in the downwardly inclined flat surface 46. The supplemental track 47 is disposed in upwardly spaced relation to the upper surface of the track 29 or 30, being held in this position by means of interposed cleats or transversely disposed connecting members 50. The rear face of the block 48 is disposed in abutting relation to the forward side of the forward supporting member 42 and a rearward extension 51 is formed with the block 48 and engages over the upper surface of the forward portion of the block 42. The upper surface of the extension 51 is downwardly and forwardly inclined being disposed in alignment with the inclined surface 46.

A longitudinally shiftable or adjustable auxiliary track structure 52 is disposed forwardly of the block 48 and comprises a track structure 53 overlapping the forward portion of the supplemental track 47 and a second track member 54, which overlies a portion of the track 47 engaging over the track 30. The two track members 53 and 54 are tied together by means of a pair of tie-bars 55, which are fixed to the two track members 53 and 54 in any suitable manner. The auxiliary track structure 53 includes a lengthwise adjustable pair of tracks 56, which are adapted to overlie the forward portion of the supplemental track 47 and the two track members 56 have secured to the forward ends thereof a depending and downwardly extending block 57, which is formed on its forward side with a concave or arcuate wheel engaging surface 58. The block 57 at its rear end 59 may abut against the forward end of the supplemental track 47 and in order to provide a means whereby the track members 53 and 54 may be held in longitudinally adjusted position relative to the tracks 29 and 30, I have provided pegs or dowels 60, which are secured to the block 57 and which are adapted to engage in selected sockets or recesses 61 which are formed in the tracks 29 and 30. A second pair of removable and auxiliary track members 62 are adapted to engage on the top of the track structure 52 and the track members 62 comprise a pair of tracks 63 and 64, which are secured together by means of a pair of cleats or connecting members 65 and 66. The first pair of auxiliary track members 52 are provided in their upper surfaces thereof with a pair of transverse channels or grooves 67 and 68 within which the cleats or tie members 65 and 66 respectively are adapted to engage. The auxiliary track members 56 at their rear ends are provided with an upwardly inclined surface 69, which merges into a horizontal upper surface 70. The horizontal or flat upper surface 70 terminates in the concave forward surface 58 of the block 57. The second auxiliary track structure 62 is formed with an upwardly inclined rear portion 71, which merges into a horizontal upper surface 72. The horizontal upper surface 72 merges into a downwardly inclined forward surface 73 which also merges with a convex forward end 74 at the forward ends of the track members 63 and 64. The convex forward surface 74 is adapted to merge with the upper end of the concave surface 58.

A rear load supporting bar 75 is adapted to movably engage the metal strips 17 and 25, being of a length to extend between the two rails 15 and 25. The load supporting member 75, at one end thereof, is provided with a tapered end 76, and an eye 77 is adapted to be fixed to the reduced or tapered end 76 so as to permit the load supporting member 75 to be engaged with a hook carried by a bar or the like in order that the load supporting member 75 may be pulled transversely across the two rails 15 and 23. When the load supporting member 75 is in inoperative position it is adapted to be moved transversely of the frame structure 10 into a housing 78. The housing 78 is formed with an end thereof opening in the direction of the rail 23 and preferably a plurality of upper and lower rollers 79 and 80 are carried by the housing 78 so that the load supporting member 75 may be easily moved inwardly or outwardly with respect to the housing 78. An upwardly and outwardly inclined bracing member 81 is secured at its upper end to the housing 78 and at its lower end to a horizontal member 82, which extends between the rearmost pair of uprights 24. The load supporting member 75 is preferably round in transverse section being constructed in the form of a roller so that this load supporting member 75 may readily roll upon the upper surface of the metal strips 17 and 25.

A second load supporting bar 83 is disposed forwardly of the load supporting member 75 and is formed with a tapered end 84 at one end thereof and an eye or ring 85 is secured to the tapered end 84. The load supporting member 83 is adapted to slidably engage the metal strips 18 and 27 and when the load supporting member 83 is in inoperative position it is adapted to be moved transversely across the beams or rails 15 and 23 to be housed in a housing 86. The housing 86 is provided on the inner portion thereof with a plurality of rollers 87 similar to the rollers 79 and 80 so that the load supporting bar or member 83 may be easily moved into or out of the housing 86. A housing brace 88 is secured at its upper end to the housing 86 and extends downwardly and inwardly toward the side member 11, being secured to a horizontal cross piece 89, which is secured between a pair of uprights 24. Preferably, the load supporting member 83 is square in transverse section or is at least provided with a flat lower surface so that when the load supporting member 83 is in engagement with the metal strips 18 and 27 the friction between the load supporting member 83 and the strips 18 and 27 will resist movement of the load supporting member 83 lengthwise of the strips 18 and 27.

In the use and operation of this unloading structure, the vehicle in the form of a trailer or truck is adapted to move through the frame structure 10 in a direction indicated by the arrows 90. The dot and dash lines 91 indicate the front bolster carried by front wheels 92. The load mounted on the bolster 91 is indicated by the dot and dash line 93. A rear bolster 94 is connected in a conventional manner to the front bolster 91 and is supported by wheels 95. The load line 93 extends from the front bolster 91 to the rear bolster 94. The load carried by the truck is moved forwardly over the ramp 43, the front wheels 92 riding over the track structures 35 and 36 and over the supplemental tracks 47 until the front wheels are disposed in substantially the position shown in Figure 1, wherein the wheels 92 are engaged with the inclined surface 73 of the track 62. At this time the rear wheels 95 will be engaged with the flat surfaces 45 of the tracks 35 and 36. With the load line 93 in the position shown in Figure 2, which is above the rails 15 and 23 and the strips 17, 25, 18 and 27, the rear roller or supporting bar 75 is adapted to be pulled across the rails 15 and 23 to the position shown in full lines in Figure 2 in which position the roller or supporting member 75 is disposed forwardly of the rear bolster 94. The flat load supporting bar 83 is then pulled transversely across the rails 15 and 23 and is disposed closely adjacent the forward side of the front bolster 91. The load, which may be lumber or other elongated articles may then be untied from the bolsters 91 and 94 and then the truck may be moved forwardly. As the truck moves forwardly from the dot and dash position of the bolsters 91 and 94, the front wheels 92 will ride downwardly and forwardly to the dotted line position. In this position the bolster 91ᵃ will be disposed with the upper edge thereof below the unloading line 96 shown by the dotted line in Figure 2. In this position the load will rest entirely on the supporting bars 75 and 83. The front wheel 92 will initially start downwardly over the concave or inclined surface 58 before the rear wheels 95 move downwardly over the concave lowering surface 49. The vehicle may be continued forwardly and when the wheels 95 engage the downwardly inclined or concave surface 49 the weight of the load and the movement of the vehicle will tend to push the vehicle forwardly and also to push the load forwardly with the roller 75 rolling between the load and the upper surfaces of the metal strips 17 and 25. When the wheel 95 engages the supplemental track structure 47 the rear bolster 94 will be positioned below the load supporting bar 95 and at the same time the forward bolster 91 will be disposed in the position 91ᵃ, which is below the supporting member 83. At this time the second auxiliary track members 62 may be removed from the first auxiliary track structure 52 being pulled inwardly so that they will rest on the tie-bars 55, which also constitute auxiliary track supporting bars. The distance between the upper surface of the first auxiliary track 52 and the load line 96 will permit sufficient clearance for the rear bolster 94 so that this bolster may clear the forward load supporting rail or member 83.

In certain instances it is not necessary to use the second auxiliary track structure 62, as the height of the first auxiliary track structure 52 is sufficient to provide enough clearance between the rear bolster 94 and the load. The forward load supporting rail 83 being in the dotted line position, shown in Figure 2, will not interfere with or contact with the rear bolster 94 as this bolster is moved forwardly and then downwardly with the rear wheels riding downwardly over the inclined surfaces 58.

An unloading structure constructed according to this invention will provide a device whereby a single person, such as the truck driver, may within a very short space of time, such as three to five minutes, remove a full load of lumber or other elongated articles which are mounted on the bolsters of a truck trailer. By removing the load in a quick manner the truck may be used a greater number of times within one day than is at present the case where it is necessary for the truck driver to wait at the point of discharge until the total load has been removed, in certain instances, piece by piece. This latter procedure consumes from one to two or three hours, whereas the apparatus hereinbefore described will permit removal of the load by the driver of the truck in a space of time not over five minutes, and in many instances within two or three minutes. It will, of course, be understood that when the load is resting on the load supporting members 75 and 83, the load must be removed from these supporting members by well-known means, but during the time that the load is being removed from the supporting members 75 and 83, the truck may return to the point of receiving the load and obtain a second load through the medium of a loading structure forming the basis of a co-pending application Serial No. 347,060 filed of even date herewith. The only loss of time of the truck and the driver with the use of this device and also the loading device will be in the travel of the truck from the point of receipt to the point of discharge.

This unloading structure may be made from lumber or, if desired, the base track structure may be made out of metal, concrete or the like with the auxiliary track structure made out of any suitable material. A device has been constructed according to this invention and placed in actual operation and has been found to expedite the unloading of a complete load of a trailer or truck and, if desired, the device may be shifted from one location to another. It will be understood that under certain conditions the frame structure 10 may be provided with rollers or wheels so that it may be readily shifted from one point to another and in addition it will be understood that, if desired, the rails 15 and 23 may be cut-off between the metal strips so that the entire structure will be formed of two frame sections, which are spaced apart the desired distance and only connected together by the track structure hereinbefore described.

What I claim is:

1. An unloading device comprising a load supporting frame structure having a horizontal upper portion, a pair of tracks within said frame structure, each of said tracks including a pair of spaced apart wheel engaging surfaces and a second pair of removable wheel engaging surfaces having a lower level than and spaced from said first surfaces, means to permit for longitudinally adjusting the position of the said second pair of wheel engaging surfaces relative to said first pair of wheel engaging surfaces, and a pair of load supporting members engageable beneath the load and with said horizontal upper portion to thereby support the load when the vehicle wheels are disposed on said lower level track surfaces.

2. An unloading device comprising a load supporting frame having a horizontal upper portion, a pair of tracks within said frame structure including spaced pairs of vertically offset wheel engaging surfaces, means to permit for longitudinally adjusting the position of one of the pairs of wheel engaging surfaces relative to another pair of said surfaces, one of said pairs of wheel engaging surfaces being removable, and a pair of load supporting members engageable beneath the load and shiftable lengthwise of said frame structure with the movement of the load and vehicle relative to said frame structure, the vehicle shifting downwardly from one pair of said offset surfaces to another pair of said offset surfaces to thereby effect transfer of the load from the vehicle to said load supporting members.

3. A vehicle unloading device comprising a load supporting device comprising a load supporting frame including a pair of vertical side frame members, each side member comprising a horizontal upper rail and upright rail supporting posts, transverse base members secured to said posts, and a pair of tracks between said side frame members each track being formed of a pair of rear vertically offset track sections, and a pair of removable track sections forwardly of said rear sections and means correlating with said track sections engageable with the load and with said upper rails to remove the load upon movement of the vehicle between said side frame members.

4. A vehicle unloading device comprising a load supporting frame, load supporting members engageable with the upper edge of said frame and movable thereover during the transfer of the load from the vehicle to said members, one of said members being round in transverse section and the other of said members having a flat frame engaging surface, and a track structure in said frame formed of pairs of vertically offset track sections adapted to lower the vehicle relative to said members to thereby effect transfer of the load from the vehicle to said members.

5. A vehicle unloading device comprising a load supporting frame, load supporting members engageable with the upper edge of said frame and movable thereover during the transfer of the load from the vehicle to said members, one of said members being round in transverse section and the other of said members having a flat frame engaging surface, and a track structure in said frame formed of pairs of vertically offset track sections adapted to lower the vehicle relative to said members to thereby effect transfer of the load from the vehicle to said members, one pair of said offset track sections being so positioned with respect to another pair of track sections as to at least partially lower one portion of the vehicle prior to the lowering of the vehicle by said other pair of track sections.

6. A vehicle unloading device comprising a load supporting frame, load supporting members engageable with the upper edge of said frame and movable thereover during the transfer of the load from the vehicle to said members, one of said members being round in transverse section and the other of said members having a flat frame engaging surface, and a track structure in said frame formed of pairs of vertically offset track sections adapted to lower the vehicle relative to said members to thereby effect transfer of the load from the vehicle to said members, one pair of said offset track sections being so positioned with respect to another pair of track sections as to at least partially effect transfer of the load to said other member prior to the complete transfer of the load to both of said members.

7. A vehicle unloading device comprising a load supporting frame structure including a horizontal load carrying upper portion, a pair of load supporting members engageable beneath the load and with said load carrying portion, and a pair of tracks within said frame structure, said tracks comprising a pair of track sections adjacent one end of the frame structure, a second pair of track sections disposed intermediate the ends of said frame structure and having the upper surfaces thereof in a horizontal plane below the horizontal plane of said first pair of track sections, a third pair of track sections between said first and second pair of track sections and having the upper surafces thereof below the horizontal plane of said second pair of track sections, and a fourth pair of track sections disposed between said second pair of track sections and the opposite end of the frame structure, said fourth pair of track sections being disposed below the horizontal plane of said second track section.

8. A vehicle unloading device for removing a load from a forwardly moving vehicle which includes a pair of horizontal load supporting members between which the loaded vehicle is adapted to move, means holding the load in a horizontal plane during the movement of the vehicle and load between said members, and means imparting a downward shifting of the vehicle away from the load while the load is held in a horizontal plane and while the vehicle is moving forwardly, said latter means including means engageable by the forward wheels of the vehicle and removable after the forward wheels have passed thereover for positioning the rear portion of the unloaded vehicle below the load to thereby admit free movement of the unloaded vehicle beneath the load.

COY I. CROW.